Nov. 20, 1962 W. A. FEURER 3,064,916
CORE FOR CONTROLLING THE WINDING AND UNWINDING
ACTION IN A FILM MAGAZINE
Filed March 21, 1961
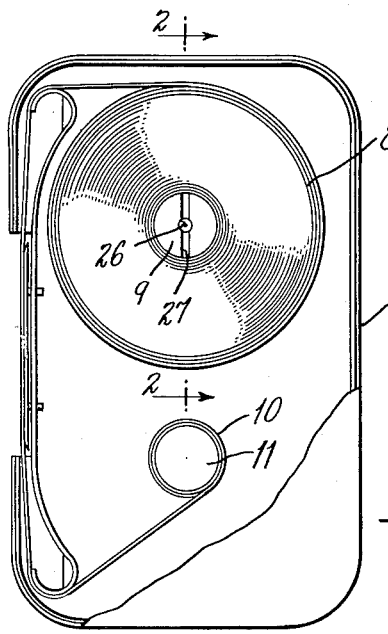
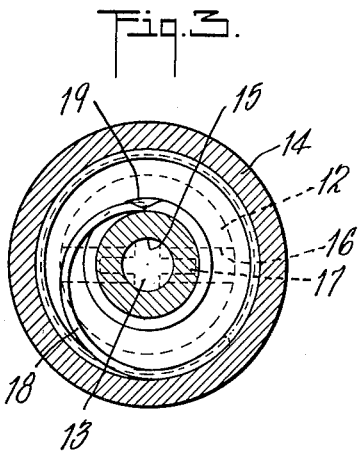
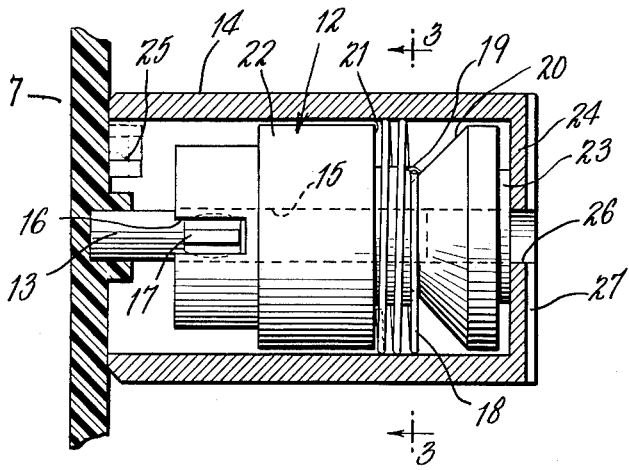
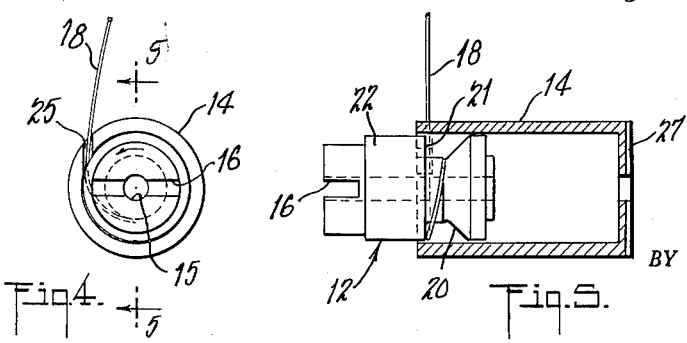
*INVENTOR.*
WALTHER FEURER
BY
*ATTORNEY*

3,064,916
CORE FOR CONTROLLING THE WINDING AND
UNWINDING ACTION IN A FILM MAGAZINE
Walther Alphonse Feurer, White Plains N.Y., assignor to Feurer Bros., Inc., White Plains, N.Y., a corporation of New York
Filed Mar. 21, 1961, Ser. No. 97,223
1 Claim. (Cl. 242—68.3)

The invention herein disclosed relates to magazines containing film winding and unwinding cores and which are placed in and removed from the camera in this unitary form.

Objects of the invention are to provide a simple, practical core structure, which without taking up any more room than an ordinary core will automatically control the unwinding film of the supply coil and prevent it from interfering with or being interfered by the film winding on the takeup core.

Further important objects of this invention are to provide this automatic control core in an inexpensive easily assembled form of construction which will fit in with present day equipment.

The foregoing and other desirable objects have been accomplished by providing the core of the supply reel in a two part form comprising a center stud which is held stationary and a surrounding sleeve to which the film is attached and which has a one-way friction clutch and brake connection with the stationary center stud faced to permit controlled unwinding but prevent any rewinding or spreading tendency of the film.

Other novel features of the invention and objects accomplished are set forth and will appear in the course of the following specification.

The drawing accompanying and forming part of this specification illustrates a present commercial embodiment of the invention. Structure however may be modified and changeed as regards the immediate illustration, all within the true intent and scope of the invention as hereinafter defined and claimed.

FIG. 1 in the drawing is a plan view of a film magazine having the invention incorporated therein.

FIG. 2 is an enlarged cross sectional detail taken on substantially the plane of the line 2—2 of the supply reel in FIG. 1.

FIG. 3 is a cross sectional view of the core of the supply reel on substantially the plane of line 3—3 of FIG. 2.

FIG. 4 is an end view showing the center to which the control spring is attached being inserted in the open end of the core shell, illustrating how the center stud is rotated to wind the spring in through the guide notch in the end of the shell.

FIG. 5 is a longitudinal sectional view on substantially the plane of line 5—5 of FIG. 4, showing the stud partly entered and as being rotated to wind the spring into position about the same.

In FIG. 1 the casing of a film magazine is indicated at 7 carrying a supply roll of film 8 on core 9 and a takeup roll 10 on core 11, the supply roll mounted for rotation on a spindle carried by the magazine and the takeup roll adapted to be coupled to the film winding mechanism of the camera in which the magazine is used.

The core of the supply roll is of special construction to keep this roll under control at all times and to hold it against any backward turning or spreading tendencies.

FIGS. 2 and 3 show the supply core as made up of two parts, an inner, center post or stud 12 which is mounted on a supporting spindle 13 in the magazine and an outer relatively rotatable cylindrical shell 14 which carries the film roll.

The post has a center passage 15 to enable it being slipped over the supporting spindle of the magazine and is shown as cross notched at the inner end at 16 to engage over a radially extended key or keys 17 on the spindle and by which it will be held against rotary movement.

The two parts of the core are coupled together in a one-way slip clutch and brake combination by spring wire 18 coiled about the center stud in one or more convolutions and fastened at the inner end to the stud as by swedging of the metal of the stud thereover at 19. The outer end of this coiled spring is left free, with the outwardly expanding convolutions in free sliding frictional engagement with the inner wall of the surrounding shell. Fine diameter spring wire is preferably used thus to provide a light frictional holding engagement with the coil carrying shell, preventing any overrunning tendency without loading the film advancing mechanism of the camera.

Space for the coupling spring between the two members is provided in the illustration by forming an annular groove in the stud. This groove is of special conformation having a conical inclined wall 20 at one side, the side where the inner end of the spring is attached, for supporting or directing the inner convolution of the spring outwardly toward the inner surface of the shell and an abrupt wall 21 at the opposite side to confine the free convolutions of the spring against endwise travel in the shell.

This formation of groove leaves the stud with a large diameter head portion 22 which will confine the spring in the shell.

The inner end of the stud is shown as having a portion of less diameter at 23 to reduce frictional engagement with the inner closed end 24 of the shell.

The opposite end of the shell, in the illustration is left entirely open for free entry of the stud and the edge of this open end is shown as having a tangential notch 25 inclined to lead the spring into properly wound direction about the stud.

After the inner end of the spring wire has been attached to the stud as by swaging or in other ways and one or more turns have been wound in the groove, the parts may be assembled by entering the inner end of the stud in the shell, with the outer, free portion of the spring located in the guide slot 25. Then by relatively rotating the shell and stud, one with respect to the other the spring will be led into coiled relation about the stud. When the end of the coiled turns is reached, with the convolutions disposed within the groove, the stud may be pushed inward into final position, the head 22 pushing the coils in front of it into the shell. The coils of the spring will then by spring friction yieldingly retain the parts in this relation for all usual handling and operating purposes. The simple act of assembly thus serves to secure the parts in their intended relation.

The inner or closed end 24 of the shell is shown as having a center opening 26 therethrough to admit an instrument for forcing the stud out of the shell, if that be necessary.

Also the closed end of the shell is shown as having a cross slot 27 by which the shell may be turned by a screw driver or other such instrument as for winding or tightening the film on the core.

The cross slots in the ends of the stud and the shell enable these parts to be relatively turned whenever necessary.

The shell and stud of the core preferably have a loose running relation. The spring is coiled in the unwinding direction of movement of the spool of film so as to apply light tension in such movement and so as to act as a spring brake opposing rotative movement of the shell in the opposite direction. The film is thus permitted to unwind smoothly but is prevented from spreading or interfering with the feeding action or the winding up of film on the takeup core.

The construction is simple and inexpensive, easily assembled, has no parts to get out of order, it is completely automatic in action, does not add any bulk, since the cores need be no larger than those presently in use and can be combined with cameras of approved construction.

What is claimed is:

A core for a coil of film comprising a hollow center stud open at one end for engagement over a supporting post and having a notch at that end for engagement with a retaining key on said post, a shell for supporting a coil of film, said shell being open at one end for engagement over and rotatively mounted on said center stud, said stud having an annular groove intermediate the ends of the same, a coiled spring wire freely contained in said annular groove in frictional engagement with the inner surface of the surrounding shell and having the inner end of the same fixed to the stud and the outer end free and in frictional engagement with the shell, said shell having accessible means for rotating the same in respect to the stud independently of said spring wire, and said shell having a tangentially inclined notch at the open end thereof for leading the spring wire into coiled relation into the groove in the act of positioning the shell over the stud.

References Cited in the file of this patent

UNITED STATES PATENTS

| | | |
|---|---|---|
| 530,327 | Clark | Dec. 4, 1894 |
| 1,111,506 | Tessier | Sept. 22, 1914 |
| 1,135,702 | Larson | Apr. 13, 1915 |
| 1,407,570 | Peirce | Feb. 21, 1922 |
| 1,464,386 | Ingram | Aug. 7, 1923 |
| 2,038,869 | Rader | Apr. 28, 1936 |
| 2,059,860 | Fuerst | Nov. 3, 1936 |
| 2,241,122 | Drotning | May 6, 1941 |
| 2,322,949 | Lux | June 29, 1943 |
| 2,505,329 | Jacobson | Apr. 25, 1950 |
| 2,563,542 | Mackelduff | Aug. 7, 1951 |
| 2,770,425 | Lee | Nov. 13, 1956 |
| 2,940,682 | Steineck | June 14, 1960 |